United States Patent
Hadley et al.

(10) Patent No.: US 8,960,386 B2
(45) Date of Patent: Feb. 24, 2015

(54) DAMPING ARRANGEMENT

(75) Inventors: Kevin Richard Hadley, Much Wenlock (GB); David John Connors, Dudley (GB)

(73) Assignee: Goodrich Actuation Systems Limited (GB)

( * ) Notice: Subject to any disclaimer, the term of this patent is extended or adjusted under 35 U.S.C. 154(b) by 371 days.

(21) Appl. No.: 12/414,879

(22) Filed: Mar. 31, 2009

(65) Prior Publication Data

US 2009/0242340 A1    Oct. 1, 2009

(30) Foreign Application Priority Data

Apr. 1, 2008  (GB) .................................. 0805829.9

(51) Int. Cl.
*F16F 9/53* (2006.01)
*F16F 9/512* (2006.01)
*B64C 25/50* (2006.01)

(52) U.S. Cl.
CPC ...................................... B64C 25/50 (2013.01)
USPC ..................................... 188/267.2; 188/266.1

(58) Field of Classification Search
CPC .. B60G 2500/10; B60G 17/08; B60G 17/016; B60G 17/17; B60G 17/0162; B60G 400/412
USPC .......... 188/267.1, 267.2, 322.5, 266.1–266.3, 188/290, 294
See application file for complete search history.

(56) References Cited

U.S. PATENT DOCUMENTS

| | | | | |
|---|---|---|---|---|
| 2,661,915 A | * | 12/1953 | O'Connor | 244/103 R |
| 2,906,474 A | * | 9/1959 | Cravero | 244/50 |
| 2,974,905 A | | 3/1961 | Rumsey | |
| 3,099,424 A | * | 7/1963 | Hrusch | 244/50 |
| 3,327,974 A | * | 6/1967 | Nicholl | 244/100 R |
| 3,391,580 A | * | 7/1968 | Stadler | 74/388 R |
| 3,424,406 A | * | 1/1969 | Rumsey et al. | 244/103 R |
| 4,869,444 A | * | 9/1989 | Ralph | 244/104 FP |
| 5,277,281 A | | 1/1994 | Carlson et al. | |
| 5,482,228 A | * | 1/1996 | Hoshino | 244/50 |
| 6,095,295 A | * | 8/2000 | Park et al. | 188/267.2 |
| 6,290,038 B1 | | 9/2001 | Jensen et al. | |
| 6,637,558 B2 | | 10/2003 | Oliver et al. | |
| 6,761,243 B2 | * | 7/2004 | Stout et al. | 180/402 |
| 7,109,679 B2 | * | 9/2006 | Edson et al. | 318/611 |
| 7,175,134 B2 | * | 2/2007 | Hsu et al. | 244/104 FP |
| 8,136,754 B2 | * | 3/2012 | De Ruffray et al. | 244/50 |
| 2006/0032976 A1 | * | 2/2006 | Bachmeyer et al. | 244/104 R |

(Continued)

FOREIGN PATENT DOCUMENTS

| EP | 0392274 B1 | 4/1993 |
|---|---|---|
| EP | 1574923 | 9/2005 |

(Continued)

OTHER PUBLICATIONS

European Search Report dated Mar. 1, 2011.

(Continued)

*Primary Examiner* — Vishal Sahni
(74) *Attorney, Agent, or Firm* — Cantor Colburn LLP

(57) ABSTRACT

A damping arrangement comprises a drive member arranged to be driven for angular movement relative to a housing by a motor, and a damping device independent of the motor and operable to damp oscillating motion of the drive member relative to the housing.

6 Claims, 2 Drawing Sheets

(56) References Cited

U.S. PATENT DOCUMENTS

Figure 1:
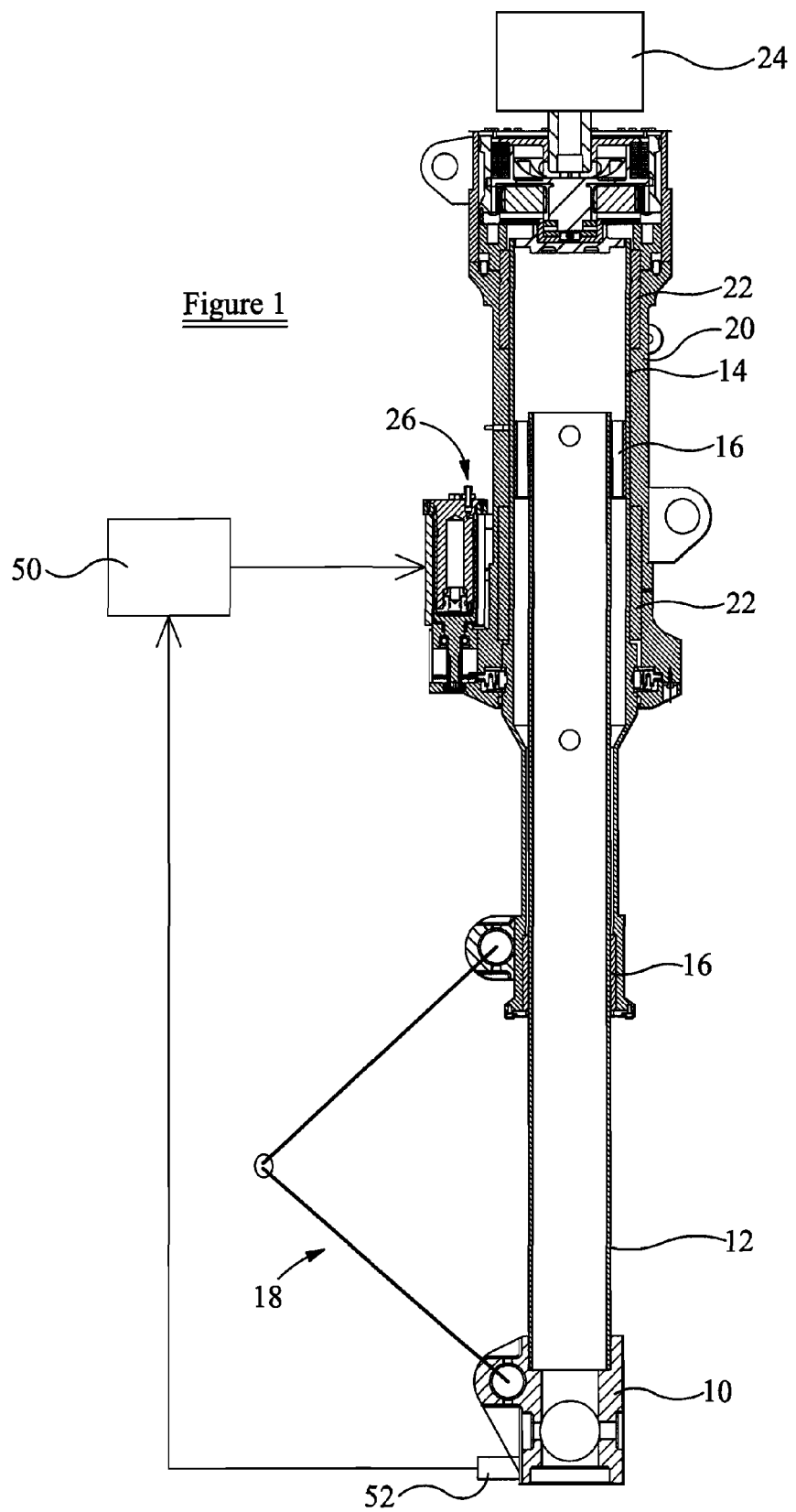

| | | |
|---|---|---|
| 2007/0241230 A1 | 10/2007 | Bucheton et al. |
| 2008/0041677 A1* | 2/2008 | Namuduri ................ 188/267.2 |
| 2009/0224100 A1* | 9/2009 | Luce ........................ 244/104 R |

FOREIGN PATENT DOCUMENTS

| | | |
|---|---|---|
| EP | 1845016 B1 | 10/2007 |
| FR | 2677951 A1 | 12/1992 |
| GB | 1416806 | 12/1975 |
| GB | 1416806 B1 | 12/2009 |
| WO | 8911991 A1 | 12/1989 |

OTHER PUBLICATIONS

Notice of Opposition to European Patent 09250914.0-1754/2107004, dated Sep. 23, 2013 pp. 7.

* cited by examiner

US 8,960,386 B2

DAMPING ARRANGEMENT

This invention relates to a damping arrangement, and in particular to a damping arrangement suitable for damping oscillations in the nosewheel of an aircraft.

The nosewheel landing gear of an aircraft typically comprises an axle support in which an axle is supported for rotation, wheels being mounted upon the axle. The axle support is mounted at the lower end of an oleo shock absorber tube, the upper end of which is received, in a telescopic manner within a drive tube. The telescopic mounting of the oleo tube is arranged to allow vertical movement of the axle support relative to the drive tube, thereby serving to absorb shocks. The nature of the mounting between the oleo tube and the drive tube permits angular movement to occur therebetween, and so in order to transmit steering movement to the axle support, a steering linkage is connected therebetween.

A motor is arranged to drive the drive tube for angular movement, thus controlling the angular position of the drive tube, and hence the angular position of the axle support and the direction in which the wheels are steered. Hydraulically powered arrangements have been used to power the drive tube for angular movement, but it is desirable to provide arrangements in which the motor is electrically powered.

One problem with nosewheel landing gear arrangements of the type outlined hereinbefore is that unbalanced loadings, surface conditions and/or vibrations can lead to the axle support oscillating from side to side, or so-called shimmying. If unchecked, resonance will typically result in the oscillations tending to increase in amplitude, and there is the risk of damage being caused to the landing gear by the oscillations, or in loss of control of the aircraft on the ground.

U.S. Pat. No. 7,175,134 describes a hydraulically powered nosewheel landing gear arrangement including a damping arrangement to damp shimmying of the axle support. The damping arrangement includes a piston located so as to have surfaces thereof exposed to the fluid pressure in the hydraulic lines connected to the hydraulic motor. In the event of shimmying, the hydraulic motor serves, to some extent, as a pump, generating a pressure difference across the piston, and the piston moves, serving to damp the shimmying motion.

U.S. Pat. No. 7,109,679 describes a nosewheel landing gear arrangement in which an electrically driven motor is used to control steering. An accelerometer is provided to sense the occurrence of shimmying motion, and in the event of such motion being sensed, the motor is controlled in such a manner as to damp the motion.

It is an object of the invention to provide a damping arrangement suitable for use in such applications which is of simple and convenient form.

According to the present invention there is provided a damping arrangement comprising a drive member arranged to be driven for angular movement relative to a housing by a motor, and a damping device independent of the motor and operable to damp oscillating motion of the drive member relative to the housing.

The drive member preferably comprises the drive tube of an aircraft nosewheel landing gear. Preferably, the motor is electrically powered.

Preferably, the damping device is controllable to permit the application of a variable magnitude damping load to the drive member.

The damping device is preferably a rotational damping device, conveniently comprising a rotatable damping member, rotatable relative to a damper housing, the damping member being rotatable upon the occurrence of angular movement of the drive member relative to its housing, and damping means operable to damp rotation of the damping member.

A gear arrangement may be provided to drive the damping member for movement.

The damping means conveniently comprises a magneto-rheological fluid located between the damping member and the damper housing, and a solenoid operable to control the magnetic field to which the magneto-rheological fluid is exposed.

Such an arrangement is advantageous in that, in the event of the occurrence of a shimmying motion, the solenoid can be actuated to vary the magnetic field applied to the magneto-rheological fluid, thereby increasing its viscosity and increasing the resistance to rotation of the damping member relative to the damper housing. The increased resistance to rotation of the damping member serves to damp angular movement of the drive member relative to its housing.

An accelerometer is preferably provided to sense the occurrence of shimmying motion. The accelerometer is preferably mounted upon an axle support of the nosewheel landing gear, but could potentially be located on other components moveable with the axle support, for example on a steering linkage or drive member of the landing gear.

A control unit is preferably arranged to monitor the output of the accelerometer, and to control the operation of the damping arrangement in response to the output of the accelerometer. Where the magnitude of the damping load is controllable, the magnitude of the applied damping load is preferably controlled in response to the magnitude of the amplitude of the sensed shimmying oscillations.

Such an arrangement is advantageous in that low magnitude shimmying oscillations may be damped by the application of relatively low magnitude damping loads before they develop into larger magnitude oscillations. By avoiding continuously applying a damping load, a relatively smaller size of motor can be used to power the drive member for angular movement in order to achieve steering.

Figure 2:
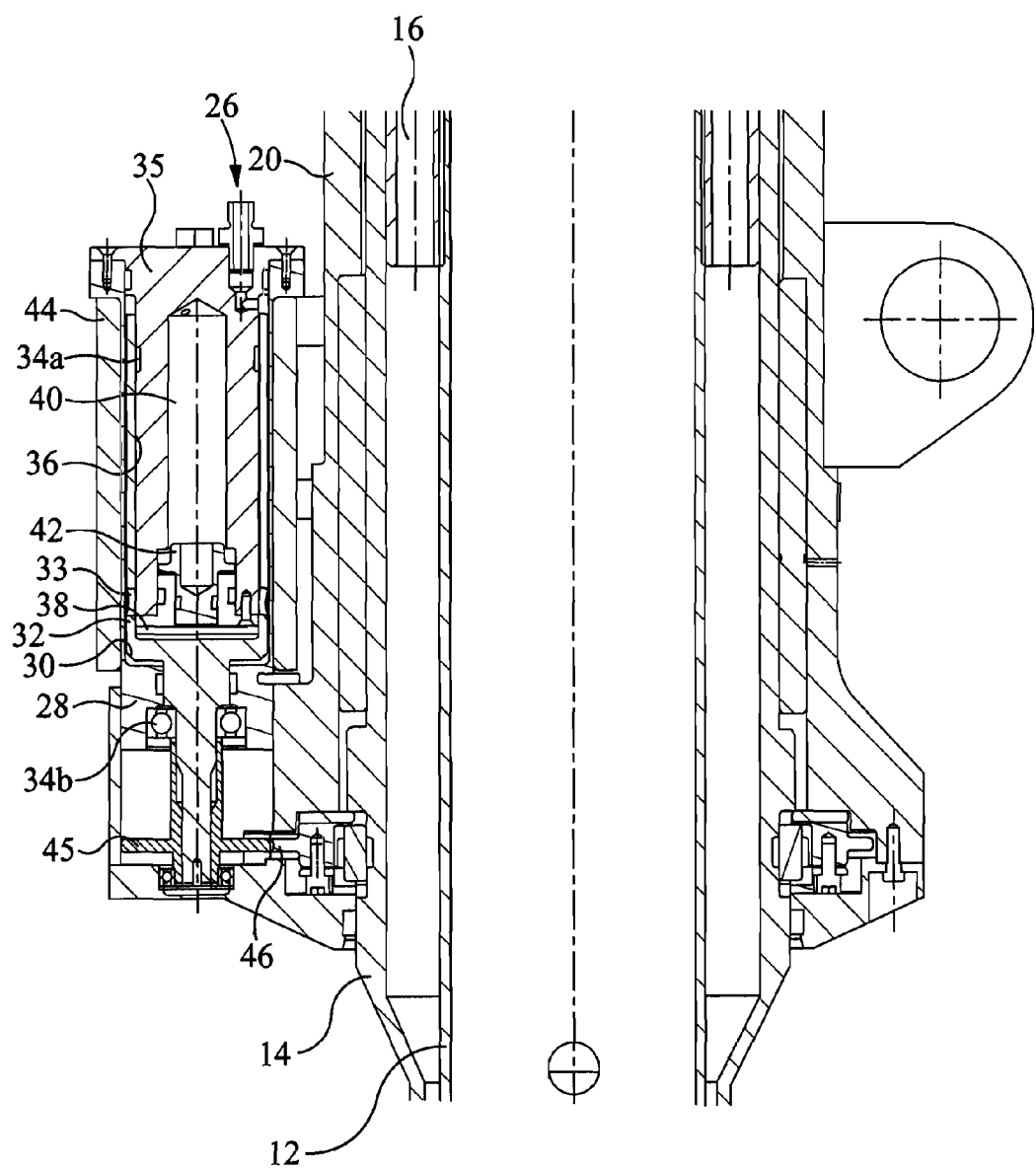

The invention will further be described, by way of example, with reference to the accompanying drawings, in which:

FIG. 1 is a sectional view illustrating a nosewheel landing gear in accordance with one embodiment of the invention; and FIG. 2 is an enlargement of part of the landing gear of FIG. 1, illustrating the damping arrangement thereof in greater detail.

Referring to the drawings, the nosewheel landing gear comprising an axle support 10 supporting an axle and associated wheels (not shown). The axle support 10 is mounted to the lower end of an oleo shock absorber tube 12. The upper end of the oleo tube 12 is received within a hollow, generally cylindrical drive tube 14, bearing seals 16 being provided therebetween. The bearing seals 16 support the oleo tube 12 for telescopic movement relative to the drive tube 14. The nature of the mountings between the oleo tube 12 and both the axle support 10 and the drive tube 14 permit relative angular movement therebetween, and in order to transmit angular movement of the drive tube 14 to the axle support 10, a steering linkage 18 is connected therebetween.

The drive tube 14 is mounted for angular movement relative to a support housing 20, bearings 22 supporting the drive tube 14 for such movement. An electrically powered motor and gear arrangement 24 is provided to drive the drive tube 14 for angular movement.

It will be appreciated that, in such an arrangement, operation of the motor and gear arrangement 24 can be used to control the angular position of the drive tube 14, and hence of the axle support 10, axle and wheels, and can thus be used to control steering. As described hereinbefore, there is a risk in such an arrangement of shimmying oscillations developing, and in accordance with the invention a damping arrangement 26, independent of the motor and gear arrangement 24, is provided to damp movement of the drive tube 14 relative to the support housing 20. The damping arrangement could take a range of forms, for example it could comprise a constant friction brake. However, it is preferably arranged to apply a controllable and adaptive damping load.

In the arrangement illustrated in FIG. 2, the damping arrangement 26 comprises a damper housing 28 mounted to the support housing 20. The damper housing 28 defines a cylindrical bore 30 within which is located a cup shaped damping member 32, upper and lower bearings 34a, 34b being provided to support the damping member 32 for rotation. A small radial, outer clearance is provided between the damping member 32 and the bore 30 of the damper housing 28. A cylindrical plug 35 closes the bore 30 and extends into a recess 36 of the damping member 32, an inner radial clearance being formed between the plug 35 and the recess 36 of the damping member 32. Each radial clearance may be of the order of 0.5 mm, but other dimensions are possible within the scope of the invention. A magneto-rheological fluid 38 fills the clearances between the damper housing 28, the damping member 32 and the plug 35.

The damping member 32 is provided with a series of openings 33 to allow the easy movement of fluid 38 between the inner and outer clearances.

The plug 35 is formed with a bore 40 communicating with the inner clearance and in which is located a piston 42 of a non-magnetic material. Although not illustrated, a spring may be provided to apply a biasing load to the piston 42. Expansion and contraction of the magneto-rheologocal fluid 38 is accommodated by movement of the piston 42 within the bore 40.

A solenoid 44 encircles part of the damper housing 28. The solenoid 44 may be of single or multiple winding form, and is operable to control the magnetic field applied to the magneto-rheological fluid 38 within the clearances.

Splined to a lower end of the damping member 32 is a gear 45 which meshes with a ring gear 46 secured to the drive tube 14 such that rotation or angular movement of the drive tube 14 causes the damping member 32 to rotate within the damper housing 28. The gear 45 and ring gear 46 together form a gear arrangement with a gear ratio of approximately 30:1 such that a relatively small amount of angular movement of the drive tube 14 gives rise to a relatively large amount of rotation of the damping member 32.

With reference to FIG. 1, a control unit 50 is operable to control the operation of the solenoid 44. An accelerometer 52 is mounted upon the axle support 10 and provides an output to the control unit 50 indicative of the occurrence of shimmying oscillations of the axle support 10.

In use, in the event of a shimmying oscillation occurring, the shimmying oscillatory motion of the axle support 10 is transmitted via the linkage 18 to the drive tube 14. The gear arrangement transmits such motion to the damping member 32, the nature of the gear arrangement causing the damping member 32 to rotate at a much higher speed, for example at approximately 30 times the speed, of the drive tube 14. The accelerometer 52 output provides an indication that a shimmying oscillation is occurring, and the control unit 50 controls the operation of the solenoid 44 such that the solenoid 44 increases the magnitude of the magnetic field applied across the magneto-rheological fluid 38, increasing the viscosity thereof. The increase in the viscosity of the magneto-rheological fluid 38 serves to damp rotation of the damping member 32 relative to the damper housing 28, thus damping angular motion of the drive tube 14 relative to its support housing 20.

It will be appreciated that the magnitude of the damping load applied by the damping arrangement is variable, and may be controlled so as to be related to the amplitude of the sensed oscillatory motion of the axle support 10. It has been found that by applying a relatively low magnitude damping load when a small amplitude oscillatory shimmying motion is sensed, the occurrence of larger amplitude oscillations can often be avoided. When larger amplitude oscillations are sensed, the damping load applied may be increased accordingly. Further, as the damping load is only applied when needed, the electrical motor used to power the drive tube 14 for movement can be relatively small. If a continuously applied damping load were present, the motor would need to be sized to permit it to overcome the constantly applied damping load.

Although only a single embodiment of the invention has been described hereinbefore, it will be appreciated that a wide range of modifications or alterations may be made thereto without departing from the scope of the invention. For example, although only a single accelerometer is described hereinbefore, several accelerometers could be provided. Further, the accelerometer(s) could be positioned in locations other than on the axle support. Other modifications are possible.

The invention claimed is:

1. A nosewheel steering system comprising an aircraft nosewheel landing gear drive tube having a longitudinal drive tube axis and supported by a support housing, the drive tube being arranged to be driven for angular movement about the longitudinal drive tube axis relative to the support housing by a motor to achieve steering, and a damping arrangement comprising:
    a damping device independent of the motor that damps angular oscillating motion of the drive tube about the longitudinal drive tube axis relative to the support housing, the damping device being controllable, in use, to actively vary the magnitude of a damping load applied to the drive tube, and thereby permit the application of a variable magnitude damping load to the drive tube;
    an accelerometer for sensing the occurrence of shimmying motion; and
    a control unit arranged to monitor the output of the accelerometer, and to control the operation of the damping device in response to the output of the accelerometer to actively vary the configuration of the damping device.

2. A nosewheel steering system according to claim 1, wherein the motor is electrically powered.

3. A nosewheel steering system according to claim 1, wherein the damping device is a rotational damping device.

4. A nosewheel steering system according to claim 3, wherein the damping device comprises a rotatable damping member, rotatable relative to a damper housing, the damping member being rotatable upon the occurrence of angular movement of the drive tube relative to the support housing, and damping means operable to damp rotation of the damping member.

5. A nosewheel steering system according to claim 4, wherein a gear arrangement is provided to drive the damping member for movement.

6. A nosewheel steering system according to claim 4, wherein the damping means comprises a magneto-rheological fluid located between the damping member and the damper housing, and a solenoid operable to control the magnetic field to which the magneto-rheological fluid is exposed.

* * * * *